United States Patent
Sasakawa et al.

(10) Patent No.: US 10,886,574 B2
(45) Date of Patent: Jan. 5, 2021

(54) POROUS ELECTRODE INCLUDING TITANIUM-CONTAINING OXIDE, SECONDARY BATTERY, BATTERY PACK, AND VEHICLE

(71) Applicant: Kabushiki Kaisha Toshiba, Minato-ku (JP)

(72) Inventors: Tetsuya Sasakawa, Yokohama (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 193 days.

(21) Appl. No.: 15/694,356

(22) Filed: Sep. 1, 2017

(65) Prior Publication Data

US 2018/0269539 A1 Sep. 20, 2018

(30) Foreign Application Priority Data

Mar. 17, 2017 (JP) .................. 2017-053456

(51) Int. Cl.
| | |
|---|---|
| *H01M 10/42* | (2006.01) |
| *H01M 10/0525* | (2010.01) |
| *H01M 4/62* | (2006.01) |
| *H01M 4/485* | (2010.01) |
| *H01M 2/10* | (2006.01) |
| *H01M 4/131* | (2010.01) |
| *H01M 4/02* | (2006.01) |

(52) U.S. Cl.
CPC ..... *H01M 10/4257* (2013.01); *H01M 2/1077* (2013.01); *H01M 4/131* (2013.01); *H01M 4/485* (2013.01); *H01M 4/621* (2013.01); *H01M 4/622* (2013.01); *H01M 10/0525* (2013.01); *H01M 2004/021* (2013.01); *H01M 2220/20* (2013.01)

(58) Field of Classification Search
CPC ...... H01M 4/131; H01M 4/485; H01M 4/621; H01M 4/622
USPC ........................................ 429/218.1
See application file for complete search history.

(56) References Cited

U.S. PATENT DOCUMENTS

| | | | |
|---|---|---|---|
| 7,811,703 B2 | 10/2010 | Fujita et al. | |
| 8,663,850 B2 | 3/2014 | Inagaki et al. | |
| 9,413,008 B2 | 8/2016 | Iwasaki et al. | |
| 2002/0127471 A1* | 9/2002 | Siret | H01M 4/04 |
| | | | 429/217 |
| 2005/0069777 A1 | 3/2005 | Takami et al. | |
| 2007/0009798 A1* | 1/2007 | Inagaki | C01G 23/005 |
| | | | 429/231.1 |
| 2007/0009801 A1* | 1/2007 | Inagaki | C01G 23/005 |
| | | | 429/231.95 |
| 2007/0231690 A1 | 10/2007 | Fujita et al. | |

(Continued)

FOREIGN PATENT DOCUMENTS

| | | |
|---|---|---|
| JP | 9-199179 | 7/1997 |
| JP | 2005-123183 | 5/2005 |

(Continued)

*Primary Examiner* — Sean P Cullen
(74) *Attorney, Agent, or Firm* — Oblon, McClelland, Maier & Neustadt, L.L.P.

(57) ABSTRACT

An electrode for a secondary battery includes titanium-containing oxide as an active material. The median pore diameter of the electrode is 0.050 μm or more and 0.1 μm or less and pore surface area of the electrode is 4 m²/g or more and 8 m²/g or less, by mercury porosimetry.

16 Claims, 3 Drawing Sheets

(56) References Cited

U.S. PATENT DOCUMENTS

| | | | |
|---|---|---|---|
| 2008/0176142 A1 | 7/2008 | Inagaki et al. | |
| 2008/0241692 A1* | 10/2008 | Saruwatari | H01M 4/485 |
| | | | 429/231.1 |
| 2012/0070744 A1* | 3/2012 | Moriyama | C01G 23/005 |
| | | | 429/231.1 |
| 2012/0319034 A1* | 12/2012 | Awano | C01G 23/005 |
| | | | 252/182.1 |
| 2013/0122349 A1 | 5/2013 | Iwasaki et al. | |
| 2013/0252077 A1* | 9/2013 | Iwasaki | H01M 4/602 |
| | | | 429/163 |
| 2013/0323537 A1 | 12/2013 | Iwasaki et al. | |
| 2014/0308200 A1 | 10/2014 | Sun et al. | |
| 2015/0243979 A1* | 8/2015 | Nakahara | C01G 33/00 |
| | | | 429/231.1 |
| 2016/0072132 A1 | 3/2016 | Liao et al. | |
| 2016/0268603 A1* | 9/2016 | Harada | C01G 23/005 |
| 2016/0276652 A1 | 9/2016 | Iwasaki et al. | |
| 2016/0276663 A1 | 9/2016 | Yoshida et al. | |

FOREIGN PATENT DOCUMENTS

| | | | |
|---|---|---|---|
| JP | 2005267940 A * | 9/2005 | |
| JP | 2008-243729 A | 10/2008 | |
| JP | 4709710 | 6/2011 | |
| JP | 4799245 | 10/2011 | |
| JP | 5710533 | 4/2015 | |
| KR | 10-2011-0093927 A | 8/2011 | |
| KR | 10-2013-0123491 A | 11/2013 | |
| KR | 10-2016-0112947 A | 9/2016 | |
| WO | WO-2016121947 A1 * | 8/2016 | B60L 58/21 |

* cited by examiner

POROUS ELECTRODE INCLUDING TITANIUM-CONTAINING OXIDE, SECONDARY BATTERY, BATTERY PACK, AND VEHICLE

CROSS-REFERENCE TO RELATED APPLICATIONS

This application is based upon and claims the benefit of priority from Japanese Patent Application No. 2017-053456, filed on Mar. 17, 2017, and the entire contents of which are incorporated herein by reference.

FIELD

The present invention relates to an electrode for a secondary battery, a secondary battery, a battery pack, and a vehicle.

BACKGROUND

As the application to an on-vehicle use such as microhybrid car, idling stop system, or the like and a stationary use progresses, a secondary battery like non-aqueous electrolyte battery using lithium ions is expected to have even higher capacity, longer service life, and higher output.

Lithium titanium composite oxide has a small volume change that is accompanied with charge and discharge, and therefore has excellent cycle characteristics.

Furthermore, in principle, the lithium inserting and extracting reaction of lithium titanium composite oxide hardly allows precipitation of the lithium metal, and thus there is only a small performance deterioration even when charge and discharge is repeated at high current.

In a case in which a non-aqueous electrolyte battery using lithium ions is mounted in an engine room of a vehicle like a car, wider space inside the car can be obtained by simplifying the wirings that are connected to a non-aqueous electrolyte battery.

However, as the engine room is under high temperature environment like 80° C. or so, a side reaction between an electrode active material and an electrolyte solution in the non-aqueous electrolyte battery or expansion and deterioration of a binder is caused. Due to such reasons, the output of a non-aqueous electrolyte battery using lithium ions is lowered and the service life of the battery is shortened.

DETAILED DESCRIPTION

Embodiments of the present invention will now be described hereinbelow with reference to the drawings. Incidentally, those denoted by the same reference numerals represent the same things. Also, the drawings are schematic or conceptual drawings, and it cannot be said that the relationship between thickness and width in each part, relative ratio of the size between parts, or the like are entirely the same as those of actual case. Furthermore, even in a case in which the same part is shown, the size or relative ratio may be differently shown in the drawings.

First Embodiment

As a secondary battery, one example of a non-aqueous electrolyte battery will be described.

Figure 1:
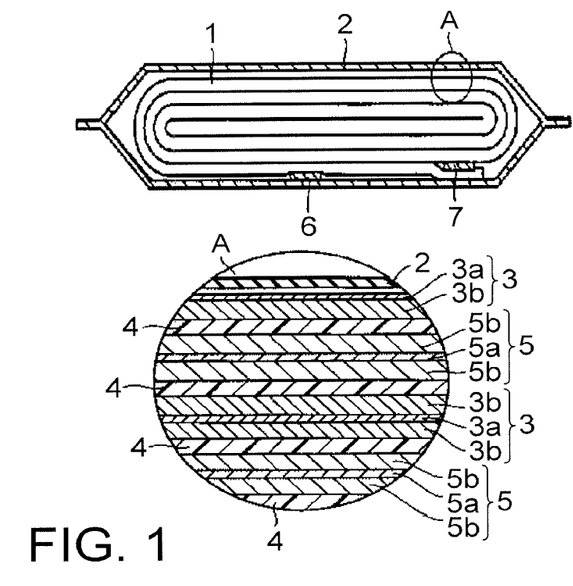
FIG. 1 is a cross-sectional view of a thin film type non-aqueous electrolyte battery.

As a top drawing of FIG. 1, a cross-sectional view of a non-aqueous electrolyte battery is given, and as a bottom drawing of FIG. 1, an enlarged view of the part A illustrated in the top drawing of FIG. 1 is given.

With regard to the top drawing of FIG. 1, a flat-shaped wound electrode group 1 is accommodated in a pouch-shaped outer casing member 2 composed of a laminate film in which an aluminum foil is interposed between two pieces of a resin layer as an outer casing member 2. With regard to the bottom drawing of FIG. 1, the flat-shaped wound electrode group 1 is formed by spiral winding of a laminate in which a negative electrode 3, a separator 4, a positive electrode 5, and a separator 4 are laminated in order from the outside followed by press molding.

With regard to the bottom drawing of FIG. 1, an outermost negative electrode 3 is composed of a negative electrode active material layer 3b which is formed on a single surface of the inner surface side of a negative electrode current collector 3a. The negative electrode 3 other than the outermost negative electrode is composed of a negative electrode active material layer 3b which is formed on both surfaces of the negative electrode current collector 3a.

A positive electrode 5 is composed of a positive electrode active material layer 5b which is formed on both surfaces of a positive electrode current collector 5a.

A negative electrode terminal 6 is connected to the negative electrode current collector 3a of the outermost negative electrode 3. A positive electrode terminal 7 is connected to the positive electrode current collector 5a of the positive electrode 5.

The negative electrode terminal 6 and the positive electrode terminal 7 are drawn to the outside via an opening of the pouch-shaped outer casing member 2. The non-aqueous electrolyte in liquid phase is injected through the opening of the pouch-shaped outer casing member 2. According to heat-sealing of the opening part of the pouch-shaped outer casing member 2 in a state in which the negative electrode terminal 6 and the positive electrode terminal 7 are drawn to the outside, the flat-shaped wound electrode group 1 and the non-aqueous electrolyte in liquid phase are completely sealed.

The negative electrode terminal 6 is formed of a material which has electric stability and conductivity in a potential range from 1 V or higher and 3 V or lower with respect to a lithium ion metal, for example. The negative electrode terminal 6 is made of an aluminum alloy containing a single kind of an element from Mg, Ti, Zn, Mn, Fe, Cu, and Si, for example. It is also possible that the negative electrode terminal 6 is made of an aluminum alloy containing plural kinds of an element from Mg, Ti, Zn, Mn, Fe, Cu, and Si. In order to reduce contact resistance with the negative electrode current collector 3a, it is preferable that the negative electrode terminal 6 is made of the same material as the negative electrode current collector 3a.

The positive electrode terminal 7 is formed of a material which has electric stability and conductivity in a potential range from 3 V or higher and 4.5 V or lower with respect to a lithium ion metal. The positive electrode terminal 7 is made of an aluminum alloy containing at least one element from Mg, Ti, Zn, Mn, Fe, Cu, and Si. It is also possible that the positive electrode terminal 7 is made of an aluminum alloy containing plural kinds of an element from Mg, Ti, Zn, Mn, Fe, Cu, and Si. In order to reduce contact resistance with the positive electrode current collector 5a, it is preferable that the positive electrode terminal 7 is made of the same material as the positive electrode current collector 5a.

Hereinbelow, the negative electrode 3, the positive electrode 5, the non-aqueous electrolyte, the separator 4, the outer casing member 2, the positive electrode terminal 7, and the negative electrode terminal 6 that are used for a non-aqueous electrolyte battery of this embodiment are described in detail.

(Negative Electrode)

The negative electrode 3 contains a negative electrode current collector 3a and a negative electrode active material layer 3b.

The negative electrode current collector 3a is preferably formed of an aluminum foil or an aluminum alloy foil containing one kind of an element from Mg, Ti, Zn, Mn, Fe, Cu, and Si, which is electrochemically stable in an electric potential region of more than 1.0 V. It is also possible that the negative electrode current collector 3a is formed of an aluminum foil or an aluminum alloy foil containing plural kinds of an element from Mg, Ti, Zn, Mn, Fe, Cu, and Si, which is electrochemically stable in an electric potential region of more than 1.0 V.

The negative electrode active material layer 3b contains a negative electrode active material, a conductive agent, and a binding agent (binder). The negative electrode active material layer 3b is formed on a single surface or both surfaces of the negative electrode current collector 3a. The blending ratio among the negative electrode active material, conductive agent, and binding agent is preferably as follows—the negative electrode active material is in the range of 70% by mass or more and 96% by mass or less, the negative electrode conductive agent is in the range of 2% by mass or more and 28% by mass or less, and the binding agent is in the range of 2% by mass or more and 28% by mass or less. If the conductive agent is less than 2% by mass, the current collecting performance of the negative electrode active material layer 3b may deteriorate and the high current characteristics of a non-aqueous electrolyte battery may be impaired. If the binding agent is less than 2% by mass, the binding property of the negative electrode active material layer 3b and the negative electrode current collector 3a may deteriorate and the cycle characteristics may be impaired. From the viewpoint of having higher capacity of a non-electrolyte battery, it is preferable that each of the conductive agent and binding agent is present at 28% by mass or less.

For the negative electrode active material of the negative electrode active material layer 3b, titanium-containing metal oxide is used.

Examples of the titanium-containing oxide include lithium titanium oxide, titanium oxide, niobium titanium oxide, and sodium titanium oxide.

Examples of the lithium titanium oxide may include lithium titanium oxide having a spinel structure (for example, $Li_{4/3+x}Ti_{5/3}O_4$ (x is a value of $0 \leq x \leq 1.1$), lithium titanium oxide having a ramsdellite structure (for example, $Li_{2+x}Ti_3O_7$ ($-1 \leq x \leq 3$)), and lithium titanium oxide represented by $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), or $Li_{2+a}A_dTi_{6-b}B_bO_{14 \pm c}$ (A is one or more kinds of an element selected from Na, K, Mg, Ca, and Sr, B is a metal element other than Ti, and $0 \leq a \leq 5$, $0 \leq b < 6$, $0 \leq c \leq 0.6$, $0 \leq d \leq 3$).

Examples of the titanium oxide include titanium oxide with monoclinic crystal structure (for example, structure before charging is $TiO_2$ (B), $LiTiO_2$ (x: $0 \leq x$)), titanium oxide with rutile structure (for example, structure before charging is $TiO_2$, $Li_xTiO_2$ (x: $0 \leq x$)), and titanium oxide with anatase structure (for example, structure before charging is $TiO_2$, $Li_xTiO_2$ (x: $0 \leq x$)).

Examples of the niobium titanium oxide include $Li_aTiM_bNb_{2 \pm \beta}O_{7 \pm \sigma}$ ($0 \leq a \leq 5$, $0 \leq b \leq 0.3$, $0 \leq \beta \leq 0.3$, $0 \leq \sigma \leq 0.3$, and M is at least one element selected from a group consisting of Fe, V, Mo, and Ta).

Examples of the sodium titanium oxide include orthorhombic Na-containing niobium titanium composite oxide that is represented by the general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $-0.5 \leq \delta \leq 0.5$, M1 contains at least one selected from Cs, K, Sr, Ba, and Ca, and M2 contains at least one selected from Zr, Sn, V, Ta, Mo, W, Fe, Co, Mn, and Al).

With regard to the measurement of pore distribution measurement of the negative electrode active material contained in the negative electrode active material layer 3b by mercury porosimetry, when the measurement is made as the pore diameter measurement range is set within 0.003 μm or more and 0.3 μm or less, the median pore diameter (the median diameter of pores) of the negative electrode active material is 0.050 μm or more and 0.1 μm or less, and the pore surface area (the surface area of pores) of the negative electrode active material is 8 m²/g or less. More preferably, the median pore diameter of the negative electrode active material is 0.065 μm or more and 0.1 μm or less.

When the negative electrode active material layer 3b is used for a non-aqueous electrolyte battery, if the median pore diameter of the negative electrode active material is excessively small, the ion conductivity of the negative electrode active material layer 3b in an electrolyte solution is lowered. Furthermore, if the median pore diameter of the negative electrode active material is excessively large, the electron conduction path between negative electrode active materials contained in the negative electrode active material layer 3b is disrupted. For such reasons, the median pore diameter of the negative electrode active material is preferably 0.050 μm or more and 0.1 μm or less. It is more preferably 0.065 μm or more and 0.1 μm or less.

If the pore surface area of the negative electrode active material is excessively small when the negative electrode active material layer 3b is used for a non-aqueous electrolyte battery, the reaction area between the negative electrode active material and an electrolyte solution is reduced so that output characteristics of a non-aqueous electrolyte battery are impaired. On the other hand, if the pore surface area of the negative electrode active material is excessively large, there are more side reactions occurring on a surface of the negative electrode active material, thus yielding an impairment of service life characteristics of the non-aqueous electrolyte battery. For such reasons, the pore surface area of the negative electrode active material is preferably 4 m²/g or more and 8 m²/g or less. Furthermore, it is more preferably 5 m²/g or more and 7 m²/g or less.

The negative electrode 3 is produced by the following method, for example.

By suspending a negative electrode active material, a conductive agent, and a binding agent in a solvent, a slurry is prepared. The slurry is coated on a single surface or both surfaces of the negative electrode current collector 3a. The slurry coated on the negative electrode current collector $3a$ is subjected to preliminary drying at 70° C. or higher and 110° C. or lower. Next, by drying at 130° C. or higher, the negative electrode active material layer $3b$ is formed. By performing pressing after that, the negative electrode 3 is produced. It is also possible that a negative electrode active material, a conductive agent, and a binding agent are molded into a pellet shape and used as the negative electrode active material layer $3b$.

As a binding agent, an acrylic binding agent or a mixture of styrene butadiene rubber (SBR) and carboxymethyl cellulose (CMC) is preferably used.

The acrylic binding agent includes an acrylic polymer. The acrylic polymer may be either a polymer or a copolymer. Alternatively, the acrylic polymer may contain both a polymer and a copolymer.

Examples of a monomer constituting the acrylic polymer include a monomer with an acrylic group and a monomer with a methacrylic group. The monomer with an acrylic group is typically acrylic acid or acrylic acid ester. The monomer with a methacrylic group is typically methacrylic acid or methacrylic acid ester.

Examples of the monomer constituting the acrylic polymer include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, acrylamide, styrene, and acrylamide.

By using the acrylic binding agent, the adhesion property between the negative electrode current collector $3a$ and the negative electrode active material layer $3b$ is improved. Accordingly, it is possible to enhance the strength of an electrode.

Compared to a binding agent like PVDF, the acrylic binding agent is less likely to be present in bulk phase on a particle surface of a negative electrode active material and has a higher coating property on a particle surface. Due to such reasons, the pore diameter of the negative electrode active material of the negative electrode active material layer $3b$ can be maintained at constant level and also the pore surface area of the negative electrode active material layer $3b$ can be reduced.

However, if a negative electrode slurry containing the above binding agent is dried at high temperature, the solvent included in the slurry rapidly vaporizes. Accordingly, a phenomenon of having localization of a binding agent on a surface of slurry, that is, migration, may easily occur. Once the migration occurs, the pore surface area of the negative electrode active material increases. For such reasons, in order to prevent the migration, the negative electrode slurry is subjected to preliminary drying at low temperature of 70° C. or higher and 110° C. or lower so that the solvent can vaporize. The temperature for preliminary drying is preferably 80° C. or higher and 100° C. or lower. As a result, 4 m²/g or more and 8 m²/g or less of the pore surface area of the negative electrode can be realized.

Furthermore, in order to prevent rapid vaporization of a solvent contained in the slurry, N-methyl-2-pyrrolidone (NMP) or water is used as a solvent, for example. However, for lithium titanium oxide and sodium lithium titanium oxide, N-methyl-2-pyrrolidone is used as a solvent instead of using water.

By modifying the press pressure at the time of pressing the negative electrode active material layer $3b$, electrode density of the negative electrode 3 can be controlled. The negative electrode active material layer $3b$ was pressed such that the negative electrode density of the negative electrode 3 is 2.25 g/cc or more and 2.70 g/cc or less. Accordingly, better contact among the particles of the negative electrode active material present within the negative electrode active material layer $3b$ can be obtained. As a result, 0.050 μm or more and 0.1 μm or less of the median pore diameter of the negative electrode 3 can be realized.

The median pore diameter and pore surface area of a negative electrode active material layer contained in the non-aqueous electrolyte battery can be measured by the following method, for example.

After discharging a non-aqueous electrolyte battery, the non-aqueous electrolyte battery is disassembled in a glove box under argon atmosphere to take out a negative electrode. The negative electrode is sufficiently cleaned with ethyl methyl carbonate and dried under reduced pressure by using a vacuum dryer of which temperature is adjusted to 100° C. After the drying, about 1 g of the negative electrode including the negative electrode current collector and negative electrode active material layer is cut, and transferred to a cell with volume of 5 cc. Under the conditions with initial pressure of 5 kPa, the pore distribution is measured by mercury porosimetry. The median pore diameter and pore surface area are calculated within a pore diameter range of 0.003 μm or more and 0.3 μm or less.

(Positive Electrode)

The positive electrode 5 contains a positive electrode current collector $5a$ and a positive electrode active material layer $5b$.

The positive electrode active material layer $5b$ contains a positive electrode active material, a conductive agent, and a binding agent. The positive electrode active material layer $5b$ is formed on a single surface or both surfaces of the positive electrode current collector $5a$.

Examples of the positive electrode active material include an oxide and a polymer.

Examples of the oxide include manganese dioxide ($MnO_2$), iron oxide, copper oxide, nickel oxide that are inserted with Li, lithium manganese composite oxide such as $Li_xMn_2O_4$ or $Li_xMnO_2$, lithium nickel composite oxide such as $Li_xNiO_2$, lithium cobalt composite oxide such as $Li_xCoO_2$, lithium nickel cobalt composite oxide such as $LiNi_{1-y}Co_yO_2$, lithium manganese cobalt composite oxide such as $LiMn_yCo_{1-y}O_2$, spinel type lithium manganese nickel composite oxide such as $Li_xMn_{2-y}Ni_yO_4$, lithium phosphates having an olivine structure such as $Li_xFePO_4$, $Li_xFe_{1-y}Mn_yPO_4$ and $Li_xCoPO_4$, iron sulfate such as $Fe_2(SO_4)_3$ and vanadium oxide such as $V_2O_5$.

Examples of the polymer include a conductive polymer material such as polyaniline and polypyrrole, and a disulfide type polymer material. Other than those, sulfur (S) and carbon fluoride can be also used.

Preferable examples of the positive electrode active material include lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$) and lithium iron phosphate ($Li_xFePO_4$) having high positive electrode voltage. It is also to be noted that x and y with regard to the composition of the above positive electrode active material are preferably in the range of more than 0 but 1 or less.

In the positive electrode active material layer $5b$, the positive electrode active material and lithium adsorbing material are preferably blended to have a total amount of 80% by mass or more and 95% by mass or less. The conductive agent is preferably blended at 3% by mass or more and 18% by mass or less. The binding agent is preferably blended at 2% by mass or more and 17% by mass or less.

Considering the conductivity of the positive electrode 5, the conductive agent preferably has an amount of 3% by mass or more. As the amount of the conductive agent is 18% by mass or less, decomposition of a non-aqueous electrolyte on a surface of the conductive agent at high temperature can be suppressed.

By having the binding agent in an amount of 2% by mass or more, the binding property between the positive electrode active material layer 5b and the positive electrode current collector 5a can be sufficiently increased. By having the binding agent in an amount of 17% by mass or less, the blending amount of a binding agent as an insulating material in the positive electrode 5 can be reduced. By reducing the blending amount of a binding agent as an insulating material in the positive electrode 5, the internal resistance of the positive electrode 5 can be reduced.

Examples of the conductive agent include a carbonaceous material such as acetylene black, carbon black, graphite, carbon nanofiber, and carbon nanotube. For the conductive agent, a carbonaceous material can be used alone, or plural kinds of a carbonaceous material can be also used.

The binding agent is to bind an active material, a conductive agent, and a current collector. Examples of the binding agent include polytetrafluoroethylene (PTFE), polyvinylidene fluoride (PVdF), fluorinated rubber, an acrylic resin, and carboxymethyl cellulose.

The positive electrode current collector 5a is preferably an aluminum foil or an aluminum alloy foil containing one kind of an element from Mg, Ti, Zn, Mn, Fe, Cu, and Si. It is also possible that the positive electrode current collector 5a is an aluminum foil or an aluminum alloy foil containing plural kinds of an element from Mg, Ti, Zn, Mn, Fe, Cu, and Si. Considering the expansion and shrinking of a positive electrode active material accompanied with charge and discharge of a non-aqueous electrolyte battery, it is more preferable to use the positive electrode current collector 5a as an electrolysis foil of which surface has been subjected to a roughening process.

The positive electrode 5 can be prepared by preparing a slurry by suspending a positive electrode active material, a conductive agent, and a binding agent in a solvent widely used, coating the slurry on the positive electrode current collector 5a followed by drying, and performing press thereafter. It is also possible that the positive electrode 5 is prepared by forming a positive electrode active material, a conductive agent, and a binding agent into a pellet shape to give a positive electrode active material layer 5b, which is then formed on top of the positive electrode current collector 5a.

(Electrolyte)

As an electrolyte, a liquid phase non-aqueous electrolyte or a gel phase non-aqueous electrolyte is used. The liquid phase non-aqueous electrolyte is prepared by dissolving an electrolyte in an organic solvent. Concentration of the non-aqueous electrolyte is preferably 0.5 mol/l or more and 2.5 mol/l or less. The gel phase non-aqueous electrolyte is prepared by compositing a liquid phase electrolyte with a polymer material.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoromethane sulfonate ($LiCF_3SO_3$), or bistrifluoromethylsulfonylimide lithium [$LiN(CF_3SO_2)_2$]. The electrolyte is used either singly or in combination of two or more types thereof. The electrolyte preferably contains lithium hexafluoro phosphate ($LiPF_6$).

The organic solvent includes, for example, cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2Me THF) and dioxolane (DOX); linear ethers such as dimethoxy ethane (DME), and diethoxy ethane (DEE); as well as γ-butyrolactone (GBL), α-methyl γ-butyrolactone (MBL), acetonitrile (AN) and sulfolane (SL). The organic solvent can be used either singly or in combination of two or more types thereof.

Examples of a more preferred organic solvent include a mixed solvent prepared by mixing at least two organic solvents among propylene carbonate (PC), ethylene carbonate (EC), carbonate (DEC), dimethyl carbonate (DMC), and methyl ethyl carbonate (MEC), and a mixed solvent containing γ-butyrolactone (GBL). By using those mixed solvents, a non-aqueous electrolyte battery with excellent low temperature characteristics can be obtained.

Examples of the polymer material include polyvinylidene fluoride (PVdF), polyacrylonitrile (PAN) and polyethylene oxide (PEO).

Furthermore, it may be also possible to use, instead of a non-aqueous electrolyte, an aqueous solution containing an electrolyte which includes lithium salts.

(Separator)

As for the separator 4, a porous film formed of a material like polyethylene, polypropylene, cellulose, and polyvinylidene fluoride (PVdF), a non-woven fabric made of synthetic resin, or the like can be used. Because the porous film formed of polyethylene or polypropylene allows melting at constant temperature and blocking of electric current, it is preferred from the viewpoint of enhancing the safety of a non-aqueous electrolyte battery.

(Outer Casing Member)

As for the outer casing member 2, a pouch-shaped container made of laminate film or a metal container is used. Examples of the shape of the outer casing member 2 include a flat shape, a square shape, a cylinder shape, a coin shape, a button shape, a sheet shape, and a laminate shape. Furthermore, it can be a small-size battery mounted on a portable electronic device or the like or a large-size battery mounted on a two-wheel to four-wheel car.

As for the laminate film, a multilayer film having a metal layer interposed between resin films is used. The metal layer is preferably an aluminum foil or an aluminum alloy foil for the reason of having light weight. As for the resin film, a polymer material like polypropylene (PP), polyethylene (PE), nylon, and polyethylene terephthalate (PET) is used. By performing sealing by heat seal, the laminate film is formed to have a shape of an outer casing member. Thickness of the laminate film is preferably 0.2 mm or less.

The metal container is formed of aluminum or an aluminum alloy. It is preferable that the aluminum alloy contains an element like magnesium, zinc, and silicon. Incidentally, content of a transition metal like iron, copper, nickel, and chrome is preferably 100 ppm or less. Accordingly, the long-term reliability and heat release property of a metal container can be remarkably improved in a high temperature atmosphere. Thickness of a metal container is preferably 0.5 mm or less. Thickness of a metal container is more preferably 0.2 mm or less.

(Positive Electrode Terminal)

The positive electrode terminal 7 is electrically stable in a potential range from 3.0 V or higher and 4.5 V or lower with respect to a lithium ion metal. The positive electrode terminal 7 is formed of a material having conductivity. The positive electrode terminal 7 is formed of an aluminum alloy which contains one kind or plural kinds of an element like Mg, Ti, Zn, Mn, Fe, Cu, and Si. In order to reduce contact resistance with the positive electrode current collector 5a, it is preferable that the positive electrode terminal 7 is formed of the same material as the positive electrode current collector 5a.

(Negative Electrode Terminal)

The negative electrode terminal 6 is electrically stable in a potential range from 1.0 V or higher and 3.0 V or lower with respect to a lithium ion metal. The negative electrode terminal 6 is formed of a material having conductivity. The negative electrode terminal 6 is formed of an aluminum alloy which contains one kind or plural kinds of an element like Mg, Ti, Zn, Mn, Fe, Cu, and Si. In order to reduce contact resistance with the negative electrode current collector 3a, it is preferable that the negative electrode terminal 6 is formed of the same material as the negative electrode current collector 3a.

According to the embodiment described above, it is possible to provide a non-aqueous electrolyte battery which has excellent high temperature durability, high output, and long service life.

Furthermore, although titanium-containing metal oxide is used as a negative electrode active material of the negative electrode 3 according to this embodiment, the titanium-containing metal oxide can be also used as a positive electrode active material of the positive electrode 5. In a case in which the titanium-containing metal oxide is used as a positive electrode active material of the positive electrode 5, a material having lower electric potential than titanium-containing metal oxide, for example, lithium metal oxide, is used as a negative electrode active material of the negative electrode 3.

Second Embodiment

The battery pack is described with reference to the drawings.

Figure 2:
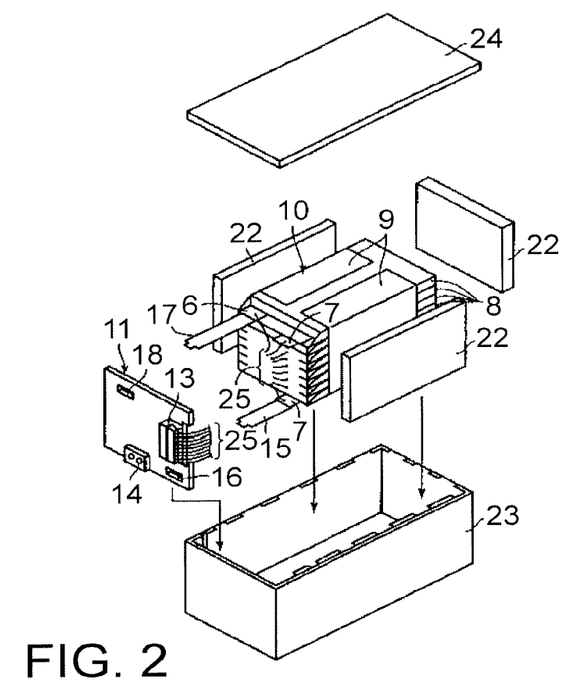
FIG. 2 is an exploded perspective view of a battery pack.

In FIG. 2, an exploded perspective view of the battery pack is illustrated.

A single battery 8 is composed of a non-aqueous electrolyte battery.

As illustrated in FIG. 2, plural single batteries 8 are laminated such that the negative electrode terminal 6 and the positive electrode terminal 7 drawn to outside are aligned in the same direction. Plural single batteries 8 constitute an assembled battery 10 according to fixation with an adhesive tape 9.

The battery pack has either one single battery 8 or plural single batteries 8. In case of including plural single batteries 8, each single battery 8 is disposed in an electrically serial manner, parallel manner, or in combination of serial and parallel manner.

The battery pack may be further provided with a protective circuit. The protective circuit is to control the charge and discharge of the non-aqueous electrolyte battery 8. Alternatively, a circuit included in a device in which the battery pack is used as a power source (for example, an electronic device, a car, or the like) can be also used as a protective circuit of the battery pack.

The battery pack may be further provided with an external terminal for energization. The external terminal for energization is to extract electric current from the single battery 8 to an outside and also to supply electric current to the single battery 8. In other words, at the time of using the battery pack as a power source, electric current is supplied to an outside via an external terminal. Furthermore, at the time of charging a battery pack, electric current for charging (including regenerative energy from driving force of a car) is supplied to a battery pack via an external terminal for energization.

Figure 3:
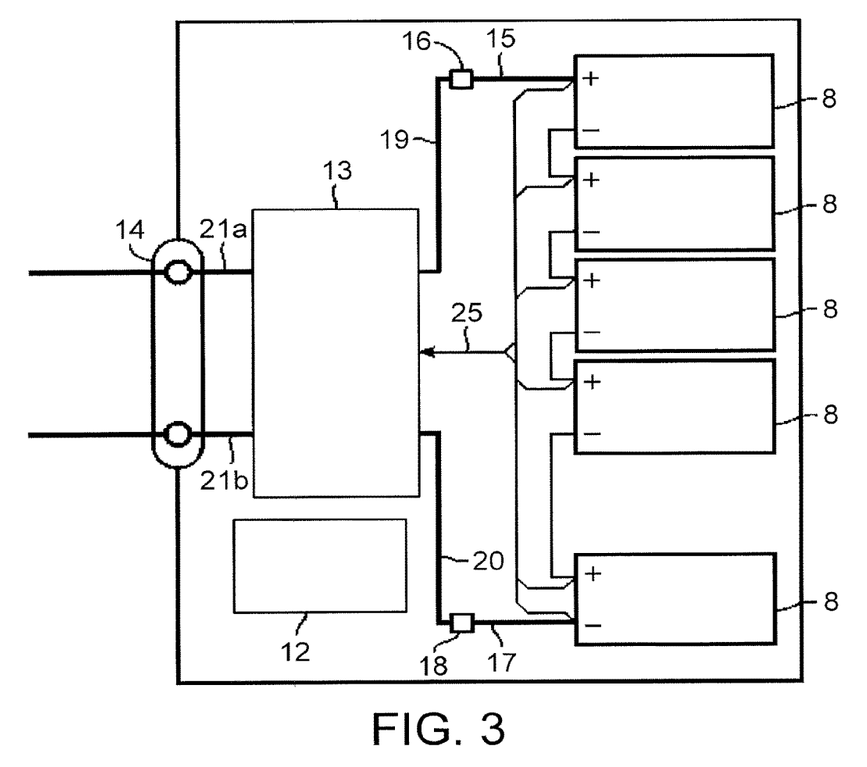
FIG. 3 is a block diagram illustrating an electric circuit of a battery pack.

In FIG. 3, a block diagram of an electric circuit of the battery pack of FIG. 2 is illustrated.

As illustrated in FIG. 3, the single batteries 8 are connected in an electrically serial manner.

A printed wiring board 11 is disposed so as to face the lateral side of the single battery 8 from which the negative electrode terminal 6 and the positive electrode terminal 7 are drawn (FIG. 2). As illustrated in FIG. 3, the printed wiring board 11 is mounted with a thermistor 12, a protective circuit 13, and a terminal 14 for energization to an external device. Furthermore, on a surface of the printed wiring board 11 which faces an assembled battery 10, an insulating plate (not illustrate) is attached in order to avoid an unnecessary connect (contact) to wiring of the assembled battery 10.

A positive electrode side lead 15 (positive electrode lead) is connected to the positive electrode terminal 7 which is present on the bottom most layer of the assembled battery 10. The tip of the positive electrode side lead 15 is electrically connected as being inserted to the positive electrode side connector 16 (positive electrode connector) of the printed wiring board 11.

A negative electrode side lead 17 (negative electrode lead) is connected to the negative electrode terminal 6 which is present on the top most layer of the assembled battery 10. The tip of the negative electrode side lead 17 is electrically connected as being inserted to a negative electrode side connector 18 (negative electrode connector) of the printed wiring board 11. Those positive electrode side connector 16 and negative electrode side connector 18 are connected to the protective circuit 13 via wirings 19 and 20 formed on the printed wiring board 11.

The thermistor 12 is to detect the temperature of the single battery 8. The detection signal from the thermistor 12 is sent to the protective circuit 13.

According to the protective circuit 13, a plus side wiring 21a and a minus side wiring 21b between the protective circuit 13 and the terminal 14 for energization to an external device, can be blocked when over charge, over discharge, over electric current, or the like of the single battery 8 is detected.

Detection of over charge or the like is carried out for individual single battery 8 or entire single battery 8. In a case in which the detection is made for individual single battery 8, it is possible that the battery voltage is detected or positive electrode electric potential or negative electrode electric potential is detected. In case of detecting positive electrode electric potential or negative electrode electric potential, a lithium electrode used as a reference electrode is inserted to individual single battery 8. In case of FIG. 2 and FIG. 3, wiring 25 for voltage detection is connected to each of the single battery 8, and the detection signal is transmitted to the protective circuit 13 via the wiring 25.

On 3 lateral sides of the assembled battery 10 except the lateral side from which the positive electrode terminal 7 and the negative electrode terminal 6 protrude, a protective sheet 22 formed of rubber or resin is disposed for each of them.

Together with each of the protective sheet 22 and the printed wiring board 11, the assembled battery 10 is housed in a housing container 23. Namely, on each of the both inner side surfaces in long-side direction and one inner side surface in short-side direction of the housing container 23, the protective sheet 22 is disposed. On the other inner side surface in short-side direction of the housing container 23, the printed wiring board 11 is disposed.

The assembled battery 10 is located in a space which is surrounded by the protective sheet 22 and the printed wiring board 11. A cover 24 is attached on top of the housing container 23.

Furthermore, for fixing the assembled battery 10, a heat shrink tape may be used instead of the adhesive tape 9. In that case, on both lateral side surfaces of the assembled battery 10, the protective sheet 22 is disposed. After winding a heat shrink tape around both lateral surfaces of the assembled battery 10, the assembled battery 10 is fixated by shrinking the heat shrink tape.

It is also possible to connect the single battery 8 in parallel to increase the battery capacity. Alternatively, serial connection of the single battery 8 and parallel connection of the single battery 8 can be combined with each other. It is also possible that the battery packs are connected in series or in parallel.

Use of the battery pack is preferably those exhibiting excellent cycle characteristics when high current is extracted. Specific examples thereof include those for a power source of a digital camera, and those mounted in a car like a two-wheel to four-wheel hybrid electric car, a two-wheel to four-wheel electric car, an assist bicycle, and a rail road car. It is particularly preferably those mounted in a car.

In a vehicle like a car mounted with a battery pack, the battery pack is to recover the regenerative energy power of a car, for example. Examples of the vehicle include a two-wheel to four-wheel hybrid electric car, a two-wheel to four-wheel electric car, an assist bicycle, and an electric train.

Figure 4:
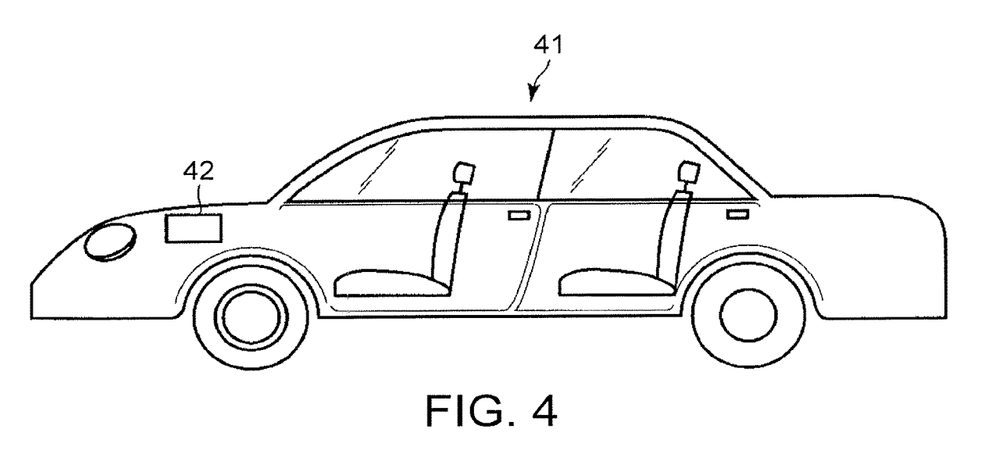
FIG. 4 is a schematic diagram illustrating a car as an exemplary vehicle.

In FIG. 4, an exemplary car equipped with the battery pack of an example according to the second embodiment is illustrated.

In an engine room located at a front side of the structure of a car 41 illustrated in FIG. 4, a battery pack 42 of an example according to the second embodiment is mounted. The mounting position for a battery pack in a car is not limited to an engine room. For example, the battery pack can be mounted in a back side of the car body, or under a seat of a car.

Figure 5:
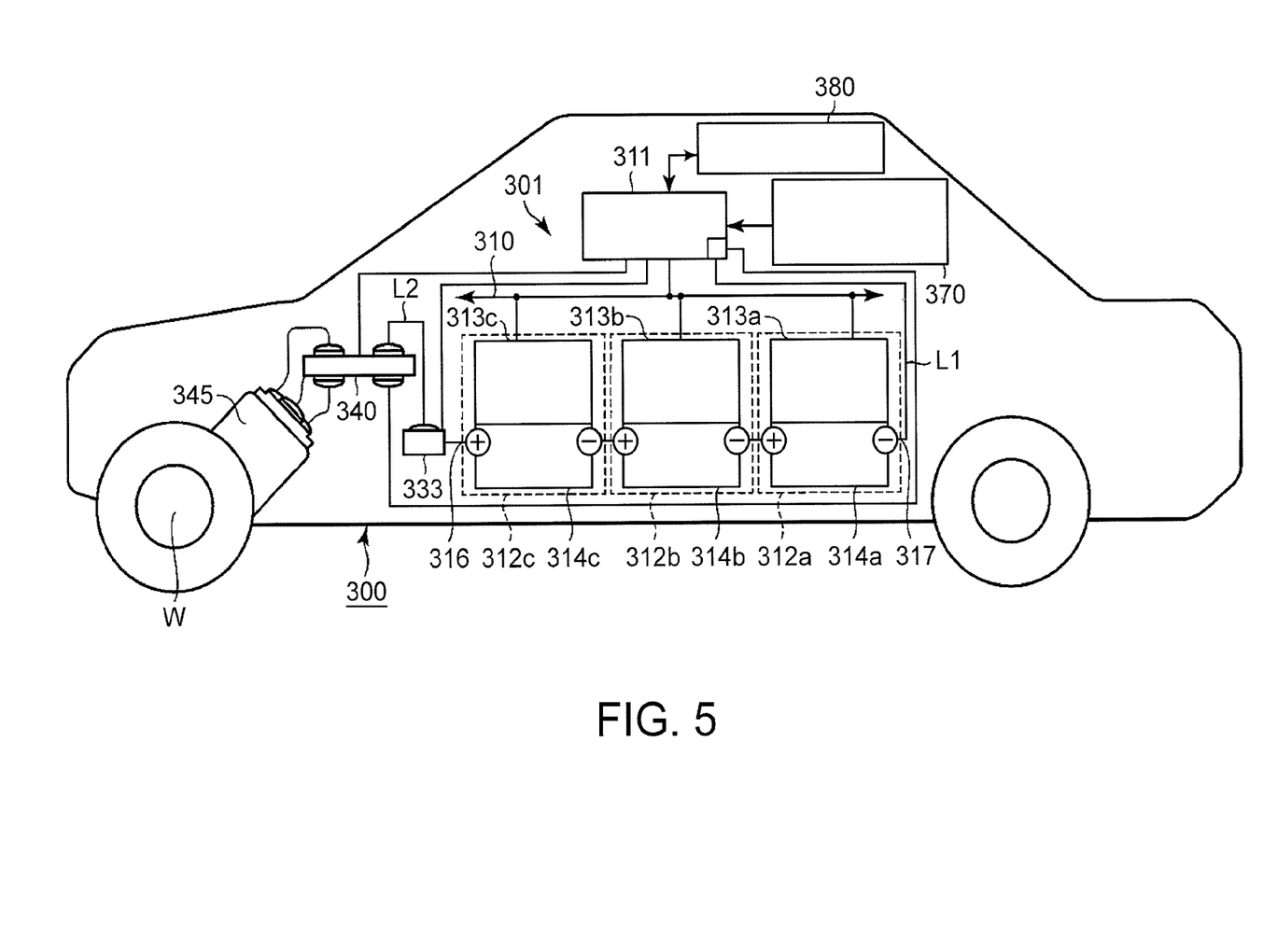
FIG. 5 is a schematic diagram illustrating an electric car as an exemplary vehicle.

In FIG. 5, a vehicle 300 equipped with the battery pack of an example according to the second embodiment is illustrated.

FIG. 5 is a drawing schematically illustrating the constitution of a vehicle which is equipped with the battery pack of an example according to the second embodiment. The vehicle 300 illustrated in FIG. 5 is an electric car.

The vehicle 300 illustrated in FIG. 5 is provided with a power source 301 for vehicle, a vehicle ECU (ECU: Electric Control Unit) 380 (electric control device), which is an upstream control device for the power source 301 for vehicle, an external terminal 370 (terminal for connection to an external power source), an inverter 340, and a drive motor 345.

In the vehicle 300, the power source 301 for vehicle is mounted in an engine room, in a back side of the structure, or under a seat of a car. In FIG. 5, however, the area for mounting a non-aqueous electrolyte battery in the vehicle 300 is just briefly illustrated.

The power source 301 for vehicle is provided with plural (for example, three packs) battery packs 312*a*, 312*b* and 312*c*, a battery management device (BMU: Battery Management Unit) 311, and a communication bus 310.

Three battery packs 312*a*, 312*b*, and 312*c* are electrically connected in series. The battery pack 312*a* is provided with the assembled battery 314*a* and an assembled battery monitoring device (VTM: Voltage Temperature Monitoring) 313*a*. The battery pack 312*b* is provided with the assembled battery 314*b* and an assembled battery monitoring device 313*b*. The battery pack 312*c* is provided with the assembled battery 314*c* and an assembled battery monitoring device 313*c*. Each of the battery packs 312*a*, 312*b*, and 312*c* can be separately removed, and can be exchanged with another separate battery pack.

Each of the assembled batteries 314*a* to 314*c* is provided with plural non-aqueous electrolyte batteries that are serially connected to each other. Each non-aqueous electrolyte battery is a battery which has been produced according to the same order as the production order of the non-aqueous electrolyte battery of the second embodiment. Each of the assembled batteries 314*a* to 314*c* is charged and discharged by the positive electrode terminal 316 and the negative electrode terminal 317, respectively.

For gathering the information regarding maintaining of the power source 301 for vehicle, the battery management device 311 collects the information like voltage, temperature or the like of a non-aqueous electrolyte battery of the assembled batteries 314*a* to 314*c*, which is included in the power source 301 for vehicle by conducting communication among the assembled battery monitoring devices 313*a* to 313*c*.

Between the battery management device 311 and the assembled battery monitoring devices 313*a* to 313*c*, the communication bus 310 is connected. The communication bus 310 is constituted such that one set of communication lines is shared at plural nodes (battery management device and one or more assembled battery monitoring devices). The communication bus 310 is a communication bus which is constituted based on CAN (Control Area Network) standard.

According to the instruction based on communication from the battery management device 311, the assembled battery monitoring devices 313*a* to 313*c* measure the voltage and temperature of an individual non-aqueous electrolyte battery which constitutes the assembled batteries 314*a* to 314*c*. In this regard, if desired, the measurement can be made at only several areas for one assembled battery, and it is acceptable that the temperature is not measured for every non-aqueous electrolyte battery.

The power source 301 for vehicle may also have an electromagnetic contactor for connecting and disconnecting the connection between the positive electrode terminal and negative electrode terminal (for example, a switch device 333 illustrated in FIG. 5). The switch device 333 includes a pre-charge switch (not illustrated) to be turned on at the time of carrying out charging of the assembled batteries 314*a* to 314*c*, and a main switch (not illustrated) to be turned on at the time of supplying battery output power to a load. The pre-charge switch and main switch are provided with a relay circuit (not illustrated) which is turned on and off according to the signal supplied to the coils disposed near the switch element.

The inverter 340 converts input DC voltage to 3-phase AC high voltage required for motor driving. Output voltage of the inverter 340 is controlled on the basis of a control signal from the battery management device 311 or a vehicle ECU 380 for controlling whole vehicle movement. The 3-phase output terminal of the inverter 340 is connected to each 3-phase input terminal of a drive motor 345.

The drive motor 345 rotates according to the power supplied from the inverter 340, and the rotation is transferred to the vehicle axis and drive wheel W via a differential gear unit, for example.

Furthermore, although not illustrated, the vehicle 300 is provided with a regenerative brake system for converting kinetic energy into electric energy as regenerative energy according to rotation of the drive motor 345 when the brake system of the vehicle 300 is turned on. The regenerated energy recovered by a regenerative brake system is supplied to the inverter 340, and converted to DC current. The DC current is then supplied to the power source 301 for vehicle.

To the negative electrode terminal 317 of the power source 301 for vehicle, one terminal of a connection line L1 is connected. The connection line L1 is connected to, via a current detection part (not illustrated) inside the battery management device 311, a negative electrode input terminal of the inverter 340.

To the positive electrode terminal 316 of the power source 301 for vehicle, one terminal of a connection line L2 is connected via a switch device 333. The other terminal of the connection line L2 is connected to a positive electrode input terminal of the inverter 340.

An external terminal 370 is connected to the battery management device 311. The external terminal 370 can be connected to an external power source, for example.

In response to operation input by an operator or the like, the vehicle ECU 380 controls the battery management unit 311 in cooperative manner with other devices and performs overall management of a vehicle. Due to the communication line between the battery management device 311 and the vehicle ECU 380, data transmission regarding maintaining the power source 301 for vehicle including residual capacity of the power source 301 for vehicle is carried out.

According to the second embodiment which has been described in the above, a battery pack excellent in safety, and also excellent in charge and discharge cycle characteristics even under high temperature environment, can be provided as it includes the non-aqueous electrolyte battery of the first embodiment.

The examples are described hereinbelow. However, as long as it does not depart from the main spirit of the present invention, the present invention is not limited to the examples that are given below.

In the following Table 1, the negative electrode active material, binder, pore surface area, median diameter of pores, 80° C. recycle service life, and 25° C. output density for Examples 1 to 14 and Comparative Examples 1 to 14 that will be described below are summarized.

The examples are described hereinbelow.

Example 1

<Production of Negative Electrode>

As a negative electrode active material, lithium titanate ($Li_4Ti_5O_{12}$) with spinel structure was used at 90% by mass. As a conductive agent, graphite was used at 7% by mass. As a binding agent, an acryl binder (acrylic binding agent) was used at 3% by mass. By mixing them with N-methyl-2-pyrrolidone (NMP), a slurry was prepared. The slurry was coated on both surfaces of the negative electrode current collector 3a which is made of aluminum foil whose thickness is 15 μm. After preliminary drying at 80° C., drying at 130° C. was carried out. By pressing the resultant, a negative electrode was obtained. The electrode density (electrode density of negative electrode) was set at 2.25 g/cc.

<Production of Positive Electrode>

As a positive electrode active material, lithium nickel composite oxide ($LiNi_{0.34}Co_{0.33}Mn_{0.33}O_2$) was used. On a surface of the positive electrode active material, an aqueous solution in which acetylene black and an acryl binder are dispersed was sprayed to obtain, by tumbling fluidization method, granulated bodies of a positive electrode active material of which surface is coated with carbon. For 90% by mass of the granules of a positive electrode active material, 3% by mass of acetylene black and 3% by mass of graphite as a conductive agent and 4% by mass of polyvinylidene fluoride (PVdF) as a binding agent were used. N-Methyl-2-pyrrolidone (NMP) was added to them followed by mixing to prepare a slurry. The slurry was coated on both surfaces of the positive electrode current collector 5a which is made of aluminum foil whose thickness is 15 μm followed by pressing after drying, and thus a positive electrode was obtained.

<Manufactured of Electrode Group>

As the separator 4, a cellulose non-woven fabric with thickness of 25 μm was used. By laminating the positive electrode, separator, negative electrode, and separator in the order, a laminate was obtained. Subsequently, the laminate was wound in spiral shape. The resultant was subjected to heat press at 80° C. to prepare a flat-shaped electrode group. In a pack having a 3-layer structure of nylon layer/aluminum layer/polyethylene layer and consisting of a laminate film with thickness of 0.1 mm, the electrode was accommodated. The resultant was dried in vacuum for 16 hours at 80° C.

<Preparation of Liquid Phase Non-Aqueous Electrolyte>

In a mixed solvent of propylene carbonate (PC) and diethyl carbonate (DEC) (volume ratio: 1:2), $LiPF_6$ was dissolved as an electrolyte at 1 mol/L to obtain a non-aqueous electrolyte solution. To inside of the laminate film pack accommodating the electrode group, the non-aqueous electrolyte solution was injected, and the pack was completely sealed by heat sealing. Accordingly, a non-aqueous electrolyte battery was obtained.

Example 2

A non-aqueous electrolyte battery was produced in the same manner as Example 1 except that the electrode density of the negative electrode is set at 2.30 g/cc.

Example 3

A non-aqueous electrolyte battery was produced in the same manner as Example 1 except that the electrode density of the negative electrode is set at 2.45 g/cc.

Example 4

A non-aqueous electrolyte battery was produced in the same manner as Example 1 except that the temperature for temporary drying (preliminary drying temperature) of the negative electrode slurry is set at 100° C.

Example 5

A non-aqueous electrolyte battery was produced in the same manner as Example 1 except that the electrode density of the negative electrode is set at 2.55 g/cc.

Example 6

A non-aqueous electrolyte battery was produced in the same manner as Example 1 except that the electrode density of the negative electrode is set at 2.60 g/cc.

Example 7

As a negative electrode active material, a bronze type titanium oxide $TiO_2$ (B) was used. The electrode density (electrode density of negative electrode) was set at 2.30 g/cc. The method is the same as Example 1 other than those.

Example 8

A non-aqueous electrolyte battery was produced in the same manner as Example 7 except that the electrode density of the negative electrode is set at 2.50 g/cc.

Example 9

As a negative electrode active material, niobium titanium oxide $Nb_2TiO_9$ was used. The electrode density was set at 2.40 g/cc. The method is the same as Example 1 other than those.

Example 10

A non-aqueous electrolyte battery was produced in the same manner as Example 9 except that the electrode density of the negative electrode is set at 2.70 g/cc.

Example 11

As a negative electrode active material, lithium sodium titanate oxide $Li_2Na_2Ti_6O_{14}$ was used. The electrode density was set at 2.30 g/cc. The method is the same as Example 1 other than those.

Example 12

A non-aqueous electrolyte battery was produced in the same manner as Example 11 except that the electrode density of the negative electrode is set at 2.50 g/cc.

Example 13

As a negative electrode binder (binding agent), styrene butadiene rubber (SBR) and carboxymethyl cellulose (CMC) were used (mixture of styrene butadiene rubber and carboxymethyl cellulose). The electrode density was set at 2.30 g/cc. A non-aqueous electrolyte battery was produced in the same manner as Example 1 other than those.

Example 14

A non-aqueous electrolyte battery was produced in the same manner as Example 13 except that the electrode density of the negative electrode is set at 2.50 g/cc.

Comparative Example 1

A non-aqueous electrolyte battery was produced in the same manner as Example 1 except that the electrode density of the negative electrode is set at 2.20 g/cc.

Comparative Example 2

For drying the negative electrode slurry, drying at 130° C. was carried out without performing any temporary drying (preliminary drying). Other than that, a non-aqueous electrolyte battery was produced in the same manner as Example 1.

Comparative Example 3

As a negative electrode binder (binding agent), polyvinylidene fluoride (PVDF) was used. The electrode density was set at 2.20 g/cc. A non-aqueous electrolyte battery was produced in the same manner as Example 1 other than those.

Comparative Example 4

A non-aqueous electrolyte battery was produced in the same manner as Comparative Example 3 except that the electrode density of the negative electrode is set at 2.30 g/cc.

Comparative Example 5

A non-aqueous electrolyte battery was produced in the same manner as Comparative Example 3 except that the electrode density of the negative electrode is set at 2.45 g/cc.

Comparative Example 6

A non-aqueous electrolyte battery was produced in the same manner as Comparative Example 3 except that the electrode density of the negative electrode is set at 2.70 g/cc.

Comparative Example 7

A non-aqueous electrolyte battery was produced in the same manner as Example 7 except that the electrode density of the negative electrode is set at 2.20 g/cc.

Comparative Example 8

For drying the negative electrode slurry, drying at 130° C. was carried out without performing any temporary drying (preliminary drying). Other than that, a non-aqueous electrolyte battery was produced in the same manner as Example 7.

Comparative Example 9

A non-aqueous electrolyte battery was produced in the same manner as Example 9 except that the electrode density of the negative electrode is set at 2.30 g/cc.

Comparative Example 10

For drying the negative electrode slurry, drying at 130° C. was carried out without performing any temporary drying (preliminary drying). Other than that, a non-aqueous electrolyte battery was produced in the same manner as Example 9.

Comparative Example 11

A non-aqueous electrolyte battery was produced in the same manner as Example 11 except that the electrode density of the negative electrode is set at 2.20 g/cc.

Comparative Example 12

For drying the negative electrode slurry, drying at 130° C. was carried out without performing any temporary drying (preliminary drying). Other than that, a non-aqueous electrolyte battery was produced in the same manner as Example 11.

Comparative Example 13

A non-aqueous electrolyte battery was produced in the same manner as Example 13 except that the electrode density of the negative electrode is set at 2.20 g/cc.

Comparative Example 14

For drying the negative electrode slurry, drying at 130° C. was carried out without performing any temporary drying (preliminary drying). Other than that, a non-aqueous electrolyte battery was produced in the same manner as Example 13.

It is found to be favorable that the median pore diameter of the electrode is 0.050 μm or more and 0.1 μm or less and the pore surface area of the electrode is 4 $m^2/g$ or more and 8 $m^2/g$ or less.

According to the embodiments, an electrode for a secondary battery, a secondary battery, a battery pack, and a vehicle with excellent high temperature durability can be provided.

The titanium-containing oxide as an electrode material can be lithium titanate oxide, titanium oxide, niobium titanium oxide, or sodium titanium oxide, and it includes spinel type lithium titantate, monoclinic β type titanium composite oxide, anatase type titanium composite oxide, ramsdellite type lithium titanate, lithium titanate sodium oxide, and niobium-containing titanium oxide.

Several embodiments of the present invention have been described. However, those embodiments are given only as

TABLE 1

| | Negative electrode active material | Binder | Pore surface area ($m^2/g$) | Median pore diameter (μm) | 80° C. cycle service life (number) | 25° C. Output density (W/kg) |
|---|---|---|---|---|---|---|
| Example 1 | $Li_4Ti_5O_{12}$ | Acryl | 6.85 | 0.100 | 4200 | 3800 |
| Example 2 | $Li_4Ti_5O_{12}$ | Acryl | 6.81 | 0.070 | 4000 | 4000 |
| Example 3 | $Li_4Ti_5O_{12}$ | Acryl | 6.65 | 0.066 | 4000 | 3800 |
| Example 4 | $Li_4Ti_5O_{12}$ | Acryl | 8.00 | 0.093 | 3500 | 4000 |
| Example 5 | $Li_4Ti_5O_{12}$ | Acryl | 5.02 | 0.062 | 3900 | 3800 |
| Example 6 | $Li_4Ti_5O_{12}$ | Acryl | 4 | 0.051 | 3800 | 3200 |
| Example 7 | $TiO_2$ (B) | Acryl | 7.12 | 0.076 | 3600 | 3700 |
| Example 8 | $TiO_2$ (B) | Acryl | 4.77 | 0.058 | 3700 | 3000 |
| Example 9 | $Nb_2TiO_9$ | Acryl | 6.85 | 0.082 | 3700 | 3800 |
| Example 10 | $Nb_2TiO_9$ | Acryl | 4.45 | 0.061 | 3700 | 3600 |
| Example 11 | $Li_2Na_2Ti_6O_{14}$ | Acryl | 7.05 | 0.079 | 3500 | 3800 |
| Example 12 | $Li_2Na_2Ti_6O_{14}$ | Acryl | 6.57 | 0.051 | 3700 | 3300 |
| Example 13 | $Li_4Ti_5O_{12}$ | SBR + CMC | 5.96 | 0.085 | 3800 | 4000 |
| Example 14 | $Li_4Ti_5O_{12}$ | SBR + CMC | 4.12 | 0.059 | 3900 | 3600 |
| Comparative Example 1 | $Li_4Ti_5O_{12}$ | Acryl | 7.01 | 0.120 | 3000 | 2500 |
| Comparative Example 2 | $Li_4Ti_5O_{12}$ | Acryl | 8.52 | 0.098 | 2900 | 3800 |
| Comparative Example 3 | $Li_4Ti_5O_{12}$ | PVdF | 8.46 | 0.098 | 2500 | 4000 |
| Comparative Example 4 | $Li_4Ti_5O_{12}$ | PVdF | 8.60 | 0.074 | 2300 | 3800 |
| Comparative Example 5 | $Li_4Ti_5O_{12}$ | PVdF | 8.63 | 0.060 | 2200 | 3800 |
| Comparative Example 6 | $Li_4Ti_5O_{12}$ | Acryl | 3.6 | 0.045 | 3500 | 2500 |
| Comparative Example 7 | $TiO_2$ (B) | Acryl | 7.49 | 0.118 | 2900 | 2400 |
| Comparative Example 8 | $TiO_2$ (B) | Acryl | 8.25 | 0.089 | 2700 | 3600 |
| Comparative Example 9 | $Nb_2TiO_9$ | Acryl | 6.92 | 0.121 | 2800 | 2300 |
| Comparative Example 10 | $Nb_2TiO_9$ | Acryl | 8.18 | 0.079 | 2700 | 3700 |
| Comparative Example 11 | $Li_2Na_2Ti_6O_{14}$ | Acryl | 7.13 | 0.109 | 3000 | 2500 |
| Comparative Example 12 | $Li_2Na_2Ti_6O_{14}$ | Acryl | 8.62 | 0.066 | 2800 | 3800 |
| Comparative Example 13 | $Li_4Ti_5O_{12}$ | SBR + CMC | 6.21 | 0.113 | 3000 | 2400 |
| Comparative Example 14 | $Li_4Ti_5O_{12}$ | SBR + CMC | 8.05 | 0.071 | 2700 | 3800 |

From Table 1, it is recognized that Examples 1 to 14 exhibited enhanced cycle service life under 80° C. environment compared to Comparative Examples 1 to 14. Thus, according to Examples 1 to 14, it is possible to achieve a non-aqueous electrolyte battery having high service life as a side reaction between an electrode active material and an electrolyte solution or a deterioration of a binder is suppressed even in a high temperature environment like engine room of an automobile or the like.

In Table 1, each of the median pore diameter of the electrode and pore surface area of electrode is described for a case in which the measurement range of pore diameter of the electrode, which is obtained by mercury porosimetry, is 0.003 μm or more and 0.3 μm or less.

The median pore diameter of the electrode of Examples 1 to 14 was 0.051 μm to 0.100 μm and the pore surface area of the electrode of Examples 1 to 14 was 4.00 $m^2/g$ to 8.00 $m^2/g$.

an example, and it is not intended to limit the scope of the invention to them. The embodiments can be carried out in various other forms, and within a range not departing from the gist of the invention, various omissions, substitutions, and modifications can be carried out. As being included in the scope and gist of the explanations, those embodiments and modifications are also included in the inventions described in claims and their equivalents.

What is claimed is:

1. A secondary battery comprising:
    an electrode including titanium-containing oxide as an active material, the titanium-containing oxide is spinel type lithium titanate, monoclinic β type titanium oxide, niobium-containing titanium oxide or lithium titanate sodium oxide, the electrode further including acrylic binding agent or a binding agent comprising a mixture of styrene butadiene rubber and carboxymethyl cellulose;

an electrolyte dissolving in an organic solvent, the electrolyte including $LiPF_6$ and the organic solvent including propylene carbonate, and concentration of the electrolyte is 0.5 mol/l or more and 2.5 mol/l or less;

wherein median pore diameter of the electrode is 0.050 μm or more and 0.100 μM or less and pore surface area of the electrode is 4 m²/g or more and 7.12 m²/g or less, by mercury porosimetry.

2. The battery according to claim 1, wherein the electrode is a positive electrode or a negative electrode.

3. The battery according to claim 1, wherein the median pore diameter of the electrode is 0.065 μm or more and 0.100 μm or less.

4. The battery according to claim 1, wherein the pore surface area of the electrode is 5 m²/g or more and 7 m²/g or less.

5. The battery according to claim 1, wherein a measurement range of pore diameter of the electrode that is obtained by mercury porosimetry is 0.003 μm or more and 0.3 μm or less.

6. The battery according to claim 1, wherein the spinel type lithium titanate include a structure of $Li_{4/3+x}Ti_{5/3}O_4$ in which x is a value of $0 \leq x \leq 1.1$.

7. The battery according to claim 1, wherein the monoclinic β type titanium oxide include a structure before charging is $TiO_2$ (B).

8. The battery according to claim 1, wherein the niobium containing titanium oxide include $Li_aTiM_bNb_{2\pm\beta}O_{7\pm\sigma}$ in which $0 \leq a \leq 5$, $0 \leq b \leq 0.3$, $0 \leq \beta \leq 0.3$, $0 \leq \sigma \leq 0.3$, and M is at least one element selected from a group consisting of Fe, V, Mo, and Ta.

9. The battery according to claim 1, wherein the lithium titanate sodium oxide include orthorhombic Na-containing niobium titanium composite oxide that is represented by the general formula $Li_{2+v}Na_{2-w}M1_xTi_{6-y-z}Nb_yM2_zO_{14+\delta}$ in which $0 \leq v \leq 4$, $0 < w < 2$, $0 \leq x < 2$, $0 < y < 6$, $0 \leq z < 3$, $-0.5 \leq \delta \leq 0.5$, M1 contains at least one selected from Cs, K, Sr, Ba, and Ca, and M2 contains at least one selected from Zr, Sn, V, Ta, W, Fe, Co, Mn, and Al.

10. The battery according to claim 1, wherein the acrylic binding agent includes an acrylic polymer comprising a copolymer.

11. The battery according to claim 10, wherein the acrylic polymer include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, acrylamide, styrene, or acrylamide.

12. A battery pack comprising one or more of the secondary battery according to claim 1.

13. The battery pack according to claim 12, further comprising:
an external terminal for energization; and
a protective circuit.

14. The battery pack according to claim 12, wherein the battery pack is provided with a plurality of the secondary batteries and the secondary batteries are connected in an electrically serial manner, parallel manner, or in combination of serial and parallel manner.

15. A vehicle mounted with the battery pack according to claim 12.

16. The vehicle according to claim 15, wherein the battery pack is to recover regenerative energy of power in the vehicle.

* * * * *